(12) United States Patent  
Patil et al.

(10) Patent No.: US 9,124,675 B2  
(45) Date of Patent: Sep. 1, 2015

(54) METHOD AND SYSTEM FOR PROVIDING AN ENHANCED EVENT NOTIFICATION IN A UNIVERSAL PLUG AND PLAY HOME NETWORK ENVIRONMENT

(75) Inventors: Mayuresh Madhukar Patil, Bangalore (IN); Venkateswar Jeedigunta, Bangalore (IN); Je-Young Maeng, Gyeonggi-do (KR); Jun-Hyung Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/979,593

(22) PCT Filed: Jan. 19, 2012

(86) PCT No.: PCT/KR2012/000508  
§ 371 (c)(1),  
(2), (4) Date: Jul. 12, 2013

(87) PCT Pub. No.: WO2012/099425  
PCT Pub. Date: Jul. 26, 2012

(65) Prior Publication Data  
US 2013/0287188 A1    Oct. 31, 2013

(30) Foreign Application Priority Data

Jan. 19, 2011 (IN) .............................. 179/CHE/2011

(51) Int. Cl.  
*H04M 3/02* (2006.01)  
*H04L 29/08* (2006.01)  
(Continued)

(52) U.S. Cl.  
CPC ................ *H04M 3/02* (2013.01); *H04L 67/24* (2013.01); *H04L 12/2803* (2013.01); *H04M 1/57* (2013.01); *H04Q 2213/13178* (2013.01)

(58) Field of Classification Search  
CPC ..... H04L 12/16; H04L 29/06; H04L 12/2803; H04M 3/02; H04M 1/57  
USPC .................. 379/93.07, 90.01, 93.05, 142.01, 379/142.04, 142.06, 142.1; 709/204; 370/352  
See application file for complete search history.

(56) References Cited

U.S. PATENT DOCUMENTS

2002/0083143 A1   6/2002 Cheng  
2005/0041642 A1*  2/2005 Robinson ...................... 370/352  
(Continued)

FOREIGN PATENT DOCUMENTS

| CN | 1428034 | 7/2003 |
|---|---|---|
| CN | 101138203 | 3/2008 |
| CN | 101371561 | 2/2009 |

OTHER PUBLICATIONS

PCT/ISA/210 Search Report issued on PCT/KR2012/000508 pp. 3.  
(Continued)

*Primary Examiner* — Melur Ramakrishnaiah  
(74) *Attorney, Agent, or Firm* — The Farrell Law Firm, P.C.

(57) ABSTRACT

Methods and systems are provided for providing an incoming event notification to a telephony control point in a UPnP home network environment. Information associated with a remote party is fetched by a telephony server, when an incoming event associated with the remote party arrives at the telephony server. An incoming event notification associated with the incoming event is generated. The incoming event notification includes the information associated with the remote party. The incoming event with the incoming event notification is forwarded to at least one telephony control point in the UPnP home network environment. The information associated with the remote party is displayed with the incoming event notification on a display of the at least one telephony control point, when the incoming event arrives at the telephony control point.

20 Claims, 10 Drawing Sheets

(51) Int. Cl.
*H04L 12/28* (2006.01)
*H04M 1/57* (2006.01)

(56) References Cited

U.S. PATENT DOCUMENTS

| | | |
|---|---|---|
| 2007/0143488 A1 | 6/2007 | Pantalone |
| 2007/0143489 A1 | 6/2007 | Pantalone |
| 2007/0203979 A1* | 8/2007 | Walker et al. ................. 709/204 |
| 2008/0263173 A1 | 10/2008 | Weber et al. |
| 2008/0267387 A1* | 10/2008 | Strathmeyer et al. .... 379/265.09 |
| 2008/0301310 A1* | 12/2008 | Pulver et al. ................. 709/229 |
| 2009/0307307 A1 | 12/2009 | Igarashi |
| 2010/0040211 A1* | 2/2010 | Maeng et al. .............. 379/93.15 |
| 2010/0182994 A1* | 7/2010 | Rahman et al. ............... 370/352 |

OTHER PUBLICATIONS

PCT/ISA/237 Written Opinion issued on PCT/KR2012/000508 pp. 4.

European Search Report dated Oct. 30, 2014 issued in counterpart application No. 12736944.5-1862.

Chinese Office Action dated May 15, 2015 issued in counterpart application No. 201280005900.4.

\* cited by examiner

METHOD AND SYSTEM FOR PROVIDING AN ENHANCED EVENT NOTIFICATION IN A UNIVERSAL PLUG AND PLAY HOME NETWORK ENVIRONMENT

PRIORITY

This application is a National Phase Entry of PCT International Application No. PCT/KR2012/000508, which was filed on Jan. 19, 2012, and claims priority to Indian Patent Application No. 179/CHE/2011 filed in the Indian Industrial Property Office on Jan. 19, 2011, the contents of which are incorporated herein by reference.

BACKGROUND OF THE INVENTION

1. Field of the Invention

The present invention relates generally to the field of Universal Plug and Play (UPnP) communication, and more particularly, to providing an enhanced event notification in a UPnP home network environment.

2. Description of the Related Art

UPnP is a set of computer network protocols promulgated by the UPnP forum. The goals of UPnP are to allow access to connect seamlessly and to simplify implementation of networks in home (e.g., data sharing, communications, and entertainment) and corporate environments. These goals are achieved by defining and publishing UPnP device control protocols built upon open, Internet-based communication standards.

The UPnP technology can cater to a wide range of devices in a home network. The UPnP provides discovery, control, and eventing mechanisms. Discovery mechanisms are enabled using Simple Service Discovery Protocol (SSDP). Eventing mechanisms follow General Event Notification Architecture (GENA) protocol. Using these technologies, UPnP makes availability and unavailability of the UPnP devices on the fly to other devices in the UPnP home network.

UPnP architecture allows peer-to-peer networking of Personal Computers (PCs), networked appliances, and wireless devices. The UPnP architecture is a distributed, open architecture based on established standards such as, for example, Transport Control Protocol/Internet Protocol (TCP/IP), User Datagram Protocol (UDP), HyperText Transfer Protocol (HTTP) and eXtensible Mark-up Language (XML). The UPnP architecture supports zero configuration networking. For example, a UPnP compatible device from any vendor can dynamically join a network, obtain an Internet Protocol (IP) address, announce its name, convey its capabilities upon request, and learn about the presence and capabilities about other devices. On the other hand, the UPnP devices can leave the UPnP home network automatically without leaving any unwanted state information.

The foundation for UPnP networking is Internet Protocol (IP) addressing. Each UPnP device includes a Dynamic Host Configuration Protocol (DHCP) client, which searches for a DHCP server when the UPnP device is first connected to the UPnP network. If no DHCP server is available, the UPnP device assigns itself an address. If, during the DHCP transaction, the UPnP device obtains a domain name, for example, through a Domain Name System (DNS) server or via DNS forwarding, the UPnP device uses that name in subsequent network operations; otherwise the UPnP device uses its IP address.

The UPnP forum also provides telephony services for extending user experience in a home to access telephony services, such as, for example, a messaging service, a presence service, and call handling (Packet-Switched (PS)/Circuit-Switched (CS) call) service. As analogous to UPnP Device Architecture (DA), telephony defines three kinds of devices, viz., a Telephony Server (TS) that provides messaging and presence related services to the user, a telephony control point (UPnP telephony device) to initiate actions provided by the TS, and a Telephony Client device (TC) for media related handling and providing input and output to/from the TS.

The UPnP telephony services enable a user to initiate/receive calls/messages to/from any user outside of the UPnP home network using a telephony control point based on a Wide Area Network (WAN) calling technology like VOIP or other calling technologies. For example, when a call is received from another device, a call notification is provided to the telephony control point by the TS. However, the UPnP telephony services do not provide call notifications that have incoming call state and originator address.

SUMMARY OF THE INVENTION

The present invention has been made to address at least the above problems and/or disadvantages and to provide at least the advantages described below. Accordingly, an aspect of the present invention provides a method and system for providing an enhanced event notification in a UPnP home network environment.

According to one aspect of the present invention, a method is provided for providing an incoming event notification to a telephony control point in a UPnP home network environment. Information associated with a remote party is fetched by a telephony server, when an incoming event associated with the remote party arrives at the telephony server. An incoming event notification associated with the incoming event is generated. The incoming event notification includes the information associated with the remote party. The incoming event with the incoming event notification is forwarded to at least one telephony control point in the UPnP home network environment. The information associated with the remote party is displayed with the incoming event notification on a display of the at least one telephony control point, when the incoming event arrives at the telephony control point.

According to another aspect of the present invention, a system is provided that includes a telephony server and at least one telephony control point communicatively coupled to the telephony server via a UPnP home network. The telephony server is configured for fetching information associated with a remote party when an incoming event is received from a remote party, generating an incoming event notification associated with the incoming event and having the information associated with the remote party, forwarding the incoming event with the incoming event notification to the at least one telephony control point, and displaying the information associated with the remote party with the incoming event notification.

According to an additional aspect of the present invention, a method is provide for providing user information in an outgoing event in a UPnP home network environment. A request to initiate an outgoing event for a remote party is received from a telephony control point. Information associated with a user is fetched. An outgoing event notification associated with the outgoing event is generated with the information associated with the user. The outgoing event with the outgoing event notification is initiated to the remote party.

According to a further aspect of the present invention, a system is provided that includes a telephony server and at least one telephony control point communicatively coupled to the telephony server via a UPnP home network. The at least one telephony control point is configured for sending a request to initiate an outgoing event for a remote party to the telephony server. The telephony server is configured for fetching information associated with a user, generating an outgoing event notification associated with the outgoing event with the information associated with the user, and initiating the outgoing event with the outgoing event notification to the remote party so that the information associated with the user and the outgoing event notification are displayed to the remote party when the outgoing event arrives at the remote party.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The present invention provides a method and system for providing an enhanced event notification in a UPnP home network environment.

As used herein, the term 'remote party' refers to an entity located external to a UPnP home networking environment and communicatively connected to UPnP home devices via a communication channel such as, for example, a wireless area network. The terms 'remote party information' and 'information associated with a remote party' have the same meaning. Also, the terms 'user information' and 'information associated with a user' have the same meaning.

Figure 1:
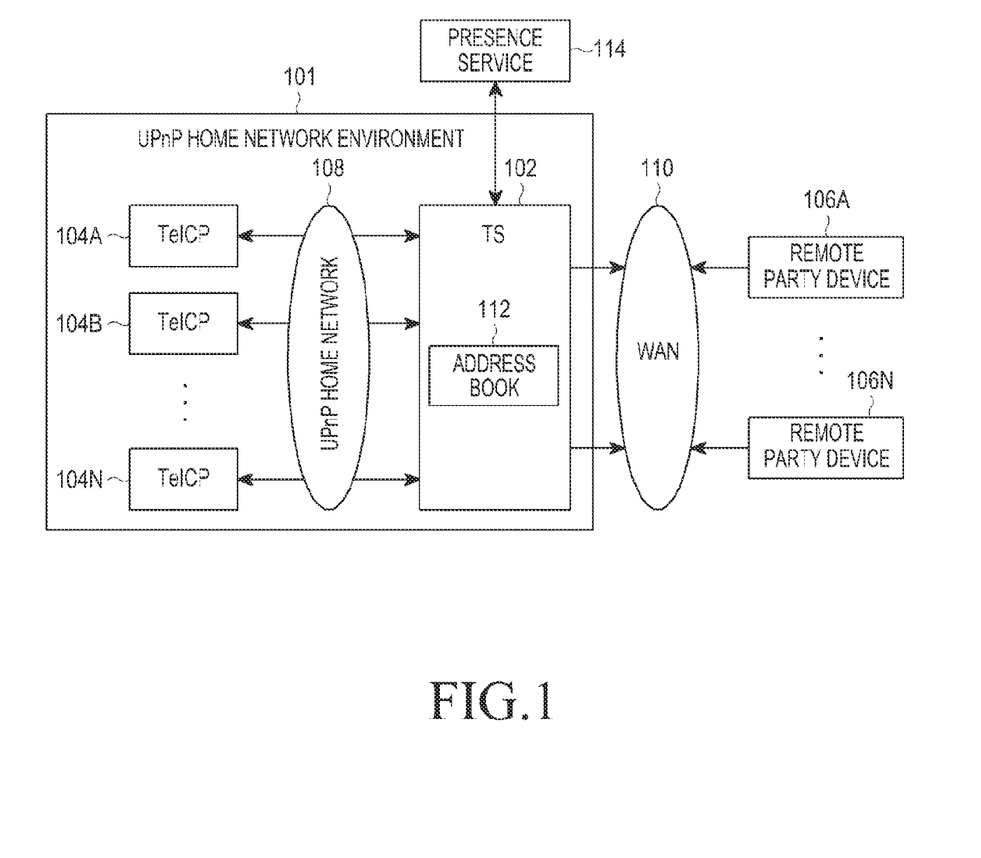
FIG. 1 is a block diagram of a UPnP home network system having a TS for providing enhanced event notifications associated with an incoming event or outgoing event, according to an embodiment of the present invention.

FIG. 1 is a block diagram of a UPnP home network system 100 for providing enhanced event notifications associated with an incoming event or outgoing event, according to an embodiment of the present invention. In FIG. 1, a UPnP home network environment 101 includes a TS 102, and TelCPs 104A-N connected to the TS 102 via a UPnP home network 108. The TS 102 is connected to devices 106A-N associated with remote party (e.g., WAN user) via a WAN 110. The TS 102 enables communication between the TelCPs 104A-N and the remote party devices 106A-N.

For the purpose of illustration, the following description is described with reference to the TelCP 104A and the remote party device 106A. It is understood by those skilled in the art that the embodiments described herein can be applied simultaneously to the entire UPnP home network system 100.

In an operation, the TS 102 receives an incoming event (e.g., a call, a message, update, etc.) intended for the TelCP 104A from the remote party device 106A over the WAN 110. The TS 102 fetches information associated with the remote party from various sources such as, for example, an address book 112, a presence service 114, and the like. The remote party information includes contact information, image information, location information, presence information, and/or service capabilities associated with the remote party.

The TS 102 generates an incoming event notification including the information associated with the remote party, and forwards the incoming event along with the incoming event notification to the TelCP 104A. Accordingly, the TelCP 104A displays the remote party information along with the incoming event notification.

In an embodiment of the present invention, the TS 102 sends the remote party information as a Uniform Resource Locator (URL) in the incoming event notification to the TelCP 104A. The TelCP 104A retrieves the remote party information from a backend server via a HTTP GET request using the URL, and displays the remote party information on the display associated with the TelCP 104A.

In another embodiment of the present invention, the TS 102 provides a link of a temporary document containing the remote party information in the incoming event notification to the TelCP 104A. The TelCP 104A retrieves the temporary document from the backend server using the link given in the incoming event notification and displays the remote party information in the temporary document.

In an additional embodiment of the present invention, the TS 102 sends the incoming event notification to the TelCP 104A in an image file or a HyperText Markup Language (HTML) page. The TS 102 includes the remote party information in a remotepartyinfo element as illustrated in APPENDIX 'A'. The remotepartyinfo element can be a peer type element. Upon receiving the incoming event notification, the TelCP 104A fetches the remotepartyinfo element stored in the TS 102, and displays the remote party information in the remotepartyinfo element along with the incoming notification indicating arrival of the incoming event.

In a further embodiment of the present invention, the TS 102 provides the incoming event notification with the remote party information to the TelCP 104A via dedicated push services of a Call Management Service (CAMS). In one implementation, the TS 102 includes the information of the remote party in a pushinfoevent state variable and pushes the pushinfoevent state variable to the TelCP 104A. The TelCP 104A retrieves the remote party information from the pushinfoevent state variable and associates the remote party information with an incoming event based on an event type. Alternatively, the TS 102 may include a caller identifier associated with the remote party in the pushinfoevent state variable along with the remote party information. Based on the caller identifier, the TelCP 104A associates the remote party information with an incoming event based on the caller identifier. It can be noted that, the TS 102 may include the remote party information and/or the caller identifier in the pustinfoevent state variable in the form of URL, or HTML file.

In another operation, the TelCP 104A sends a request to initiate an outgoing event (e.g., a call, message or chat) for the remote party, to the TS 102. The TS 102 fetches information associated with the user of the TelCP 104A based on the request. The user information includes contact information, image information, location information, presence information, and/or service capabilities associated with the user. The TS 102 generates an outgoing event notification including the information of the user, and sends the outgoing event with the outgoing event notification to the remote party. Accordingly, the device 106A associated with the remote party displays the user information in the outgoing event notification. In this manner, when a user is initiating an outgoing event to the remote party, the TelCP 104A can include information associated with the user in the outgoing event initiation request so that the user information is displayed to the remote party irrespective of whether the remote party is subscribed to the information associated with the user.

Figure 2:
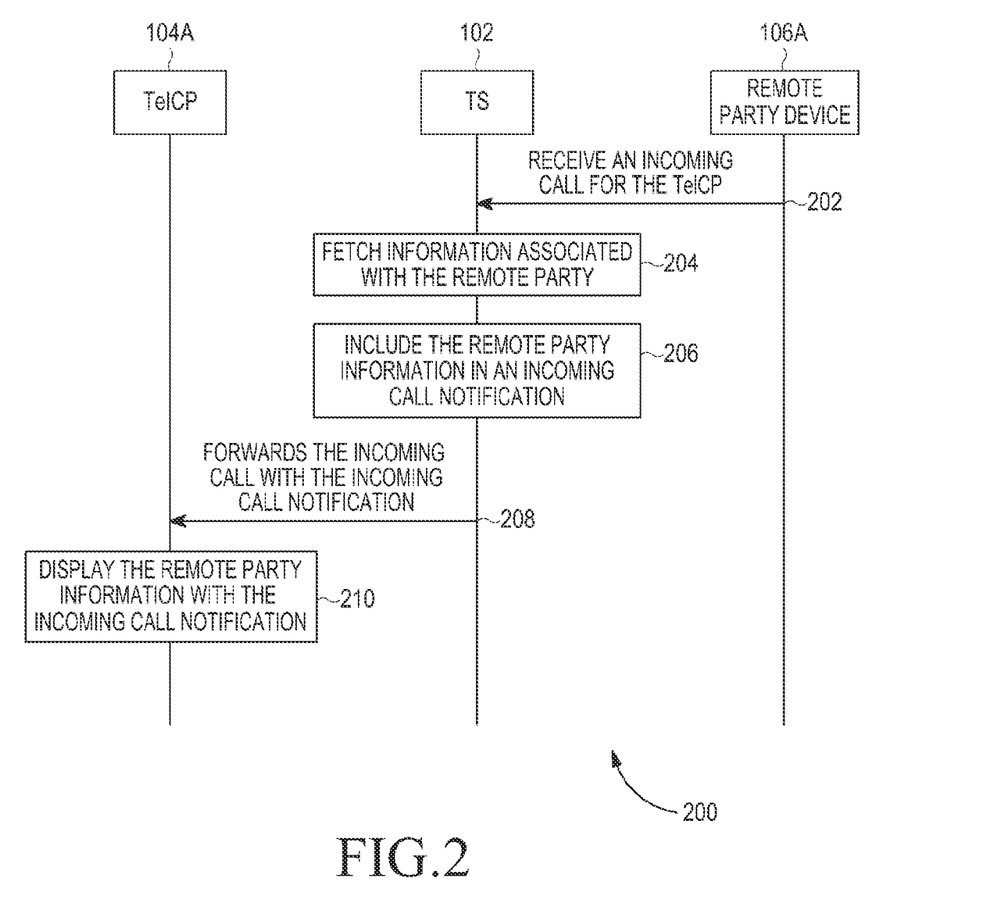
FIG. 2 is a flow diagram illustrating a method of providing enhanced incoming call notification indicating arrival of an incoming call from a remote party to a Telephony Control Point (TelCP), such as those shown in FIG. 1, according to an embodiment of the present invention.

FIG. 2 is a flow diagram 200 illustrating a method of providing enhanced incoming call notification indicating arrival of an incoming call from a remote party to the TelCP 104A, according to an embodiment of the present invention. At step 202, the TS 102 receives an incoming call intended for the TelCP 104A from the remote party device 106A. At step 204, the TS 102 fetches information associated with the remote party from various sources such as, for example, the address book 112, the presence service 114 and the like. The information associated with the remote party includes contact information, image information, location information, presence information, and service capabilities.

At step 206, the TS 102 includes the information of the remote party in an incoming call notification associated with the incoming call. In an embodiment of the present invention, the TS 102 includes the remote party information in a callinfo state variable. The callinfo state variable is defined by CAMS, which provides telephony call experience to non-telephony home devices, to event out arrival of an incoming call from the remote party to the TelCP 104A. In one implementation, the TS 102 includes the information associated with the remote party in a remote party element of the callinfo state variable as depicted in APPENDIX 'B'.

For example, the remote party element includes an image element, a location element, a service capability element, and/or a presence attribute element. The image element includes the image information in the form of binary values representing the image of the remote party. The location element includes location information of the remote party. The location information can be included as an image, geo-positioning system co-ordinates, or plain text format. The service capability element represents service capability of the remote party. The presence attribute element includes presence information associated with the remote party. The presence attribute element includes a name attribute indicating a presence attribute name and a value indicating the value of the presence attribute.

The remote party element may be a peer type element in which the remote party information is included. Exemplary schema of the peer type element is provided in APPENDIX 'C'. The peer type element contains the information to properly identify the remote party associated with the incoming call. Additionally, if the TS 102 supports a phone management profile, the TS 102 includes correspondence between the remote party and one or more contacts in an address book in the peer type element.

At step 208, the TS 102 sends the incoming call notification to the TelCP 104A. At step 210, the TelCP 104A displays the remote party information with the incoming call notification on the display associated with the TelCP 104A. The remote party information displayed on the TelCP 104A helps increase the experience of the user and initiate additional service capabilities (e.g., file transfer, video call, etc.).

Figure 3:
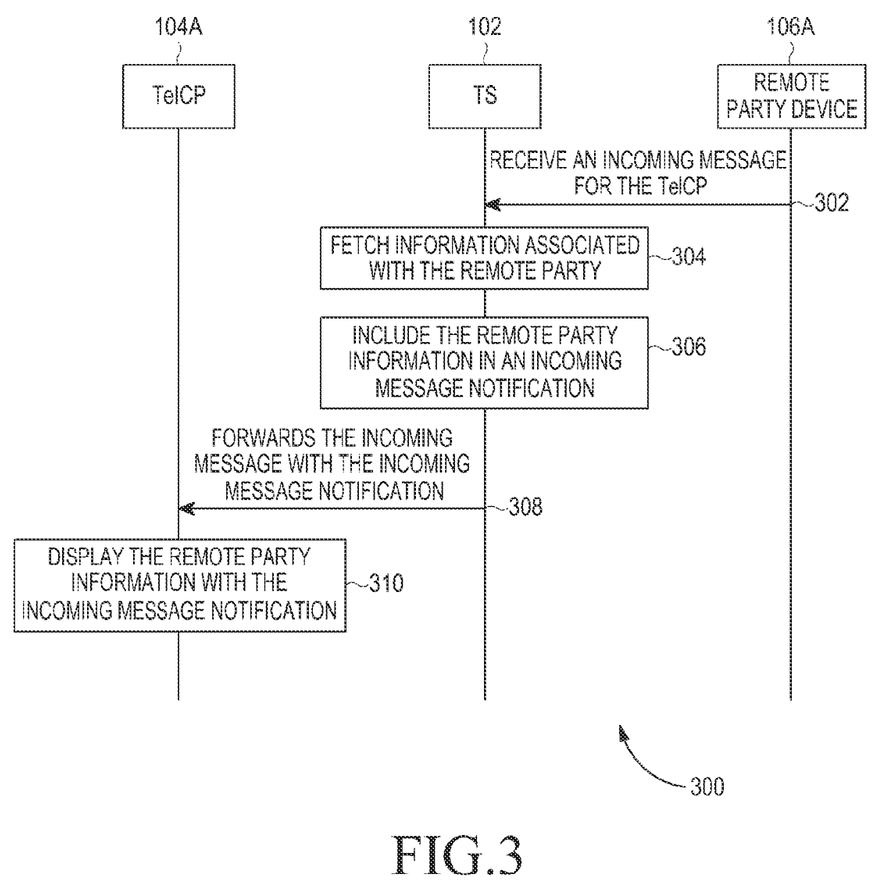
FIG. 3 is a flow diagram illustrating a method of providing an enhanced incoming message notification indicating arrival of an incoming message from a remote party to the TelCP, according to an embodiment of the present invention.

FIG. 3 is a flow diagram 300 illustrating a method of providing an enhanced incoming message notification indicating arrival of an incoming message from a remote party to the TelCP 104A, according to an embodiment of the present invention. At step 302, the TS 102 receives an incoming message (e.g., Short Message Service (SMS) message, email message, chat message, etc.) intended for the TelCP 104A, from the remote party device 106A. At step 304, the TS 102 fetches information associated with the remote party from various sources such as, for example, the address book 112, the presence service 114, and the like. The information associated with the remote party includes contact information, image information, location information, presence information, and/or service capabilities.

At step 306, the TS 102 includes the information of the remote party in an incoming message notification associated with the incoming message. In an embodiment of the present invention, the TS 102 includes the remote party information in a newmessage state variable. The newmessage state variable is defined by Messaging Service for notifying arrival of a new incoming message intended for the TelCP 104A from the remote party. A structure of the newmessage state variable is provided in APPENDIX 'D'. In some embodiments of the present invention, the newmessage state variable includes a peer type element. In these embodiments, the peer type element contains the information to properly identify the remote party associated the incoming message. Additionally, if the TS 102 supports a phone management profile, the TS 102 includes correspondence between the remote party and one or more contacts in an address book in the peer type element.

At step 308, the TS 102 sends the incoming message intended for the TelCP 104A and the incoming message notification to the TelCP 104A. At step 310, the TelCP 104A displays the remote party information with the incoming message notification on the display associated with the TelCP 104A. The remote party information displayed on the TelCP 104A helps increase the experience of the user and initiate additional service capabilities.

Figure 4:
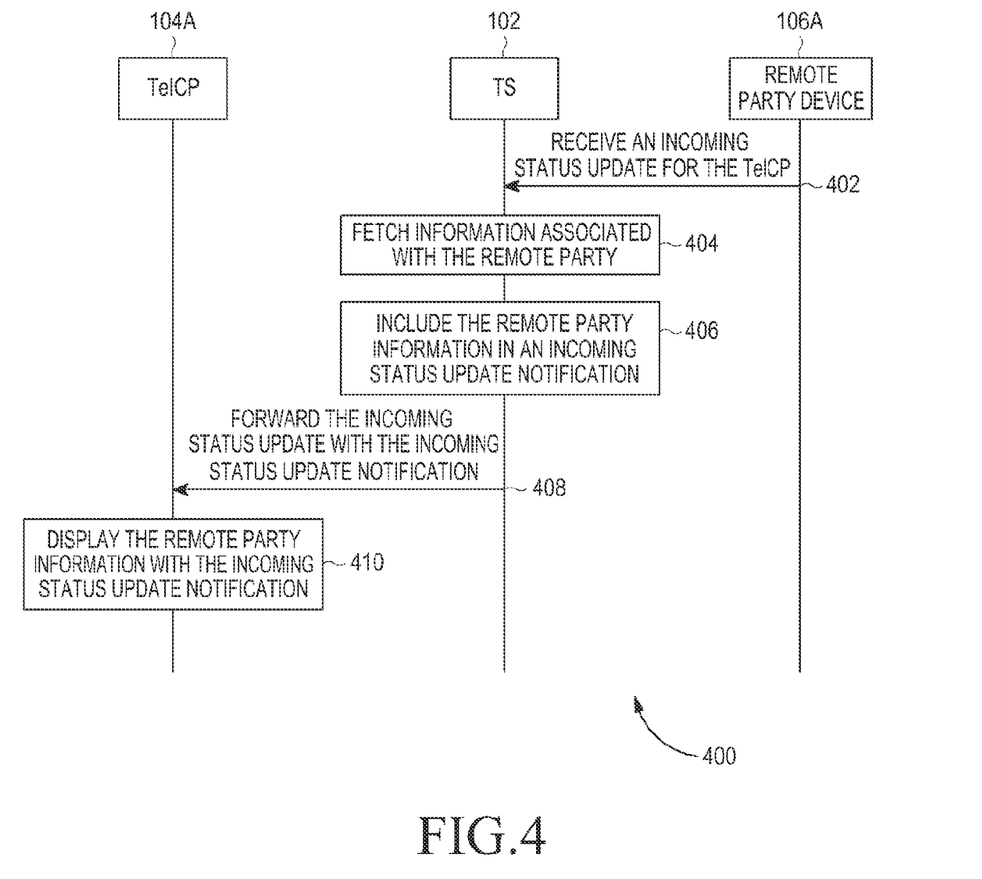
FIG. 4 is a flow diagram illustrating a method of providing an enhanced incoming session update notification indicating a session update from a remote party to the TelCP, according to an embodiment of the present invention.

FIG. 4 is a flow diagram 400 illustrating a method of providing an enhanced incoming session update notification indicating a session update from a remote party to the TelCP 104A, according tot an embodiment of the present invention. At step 402, the TS 102 receives an incoming session update intended for the TelCP 104A from the remote party device 106A. At step 404, the TS 102 fetches information associated with the remote party. The information associated with the remote party includes contact information, image information, location information, presence information, and service capabilities.

At step 406, the TS 102 includes the information associated with the remote party in an incoming session update notification. In an embodiment of the present invention, the TS 102 includes the remote party information in a session update state variable. The session update state variable is defined by the Messaging Service for notifying changes to an ongoing chat session or an incoming chat session between the TelCP 104A and the remote party. The session update state variable includes a session identifier and session status information. In some embodiments of the present invention, the session update state variable includes a peer type element. In these embodiments, the peer type element contains the information to properly identify the remote party associated with the incoming session update. Additionally, if the TS 102 supports a phone management profile, the TS 102 includes correspondence between the remote party and one or more contacts in an address book in the peer type element.

At step 408, the TS 102 sends the incoming session update intended for the TelCP 104A and the incoming session update notification to the TelCP 104A. At step 410, the TelCP 104A displays the remote party information with the incoming session update notification on the display associated with the TelCP 104A. The remote party information displayed on the TelCP 104A helps increase the experience of the user and initiate additional service capabilities.

Alternatively, the TelCP 104A may retrieve the session updates associated with an ongoing or new chat session by invoking a GetSession( ) action. The GetSession( ) action returns a SessionList which includes remote party information associated with the session update, as shown in APPENDIX 'E'.

Figure 6:
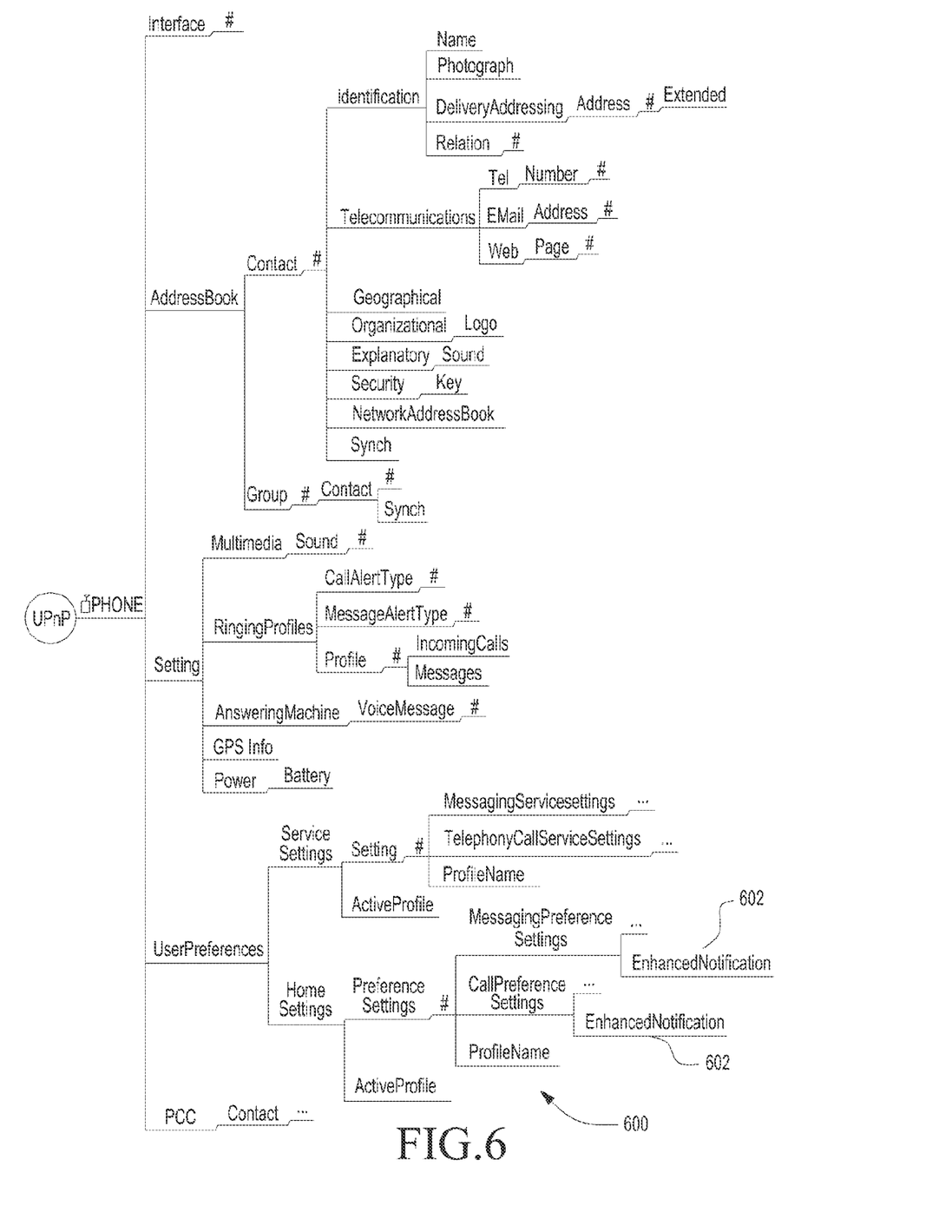
FIG. 6 is a schematic representation of a phone data model having a new element for storing preferences associated with an incoming event notification, according to an embodiment of the present invention.

In accordance with the foregoing description, embodiments of the present invention allow the user to set preferences for displaying the information associated with the remote party when an incoming event has arrived at the TelCP 104A. The TS 102 stores the preferences in a phone data model. Referring to FIG. 6, a phone data model 600 includes a new element 'Enhanced Notification' 602 for storing the preferences set for displaying remote party information during arrival of the incoming event. For example, the new element 'Enhanced Notification' 602 stores a value 'image', 'location', presence' and/or 'none' as the preferences set by the TelCP 104A. Therefore, depending on the value set in the new 'Enhanced Notification' element 602, the TS 102 includes information associated with the remote party in the incoming event notification. When the value of the new 'Enhanced Notification' element 602 is set to 'None', the TS 102 does not include the information associated with the remote party in the incoming event notification. Further, the CMS actions are used to manipulate the new element in the phone data model.

Figure 5:
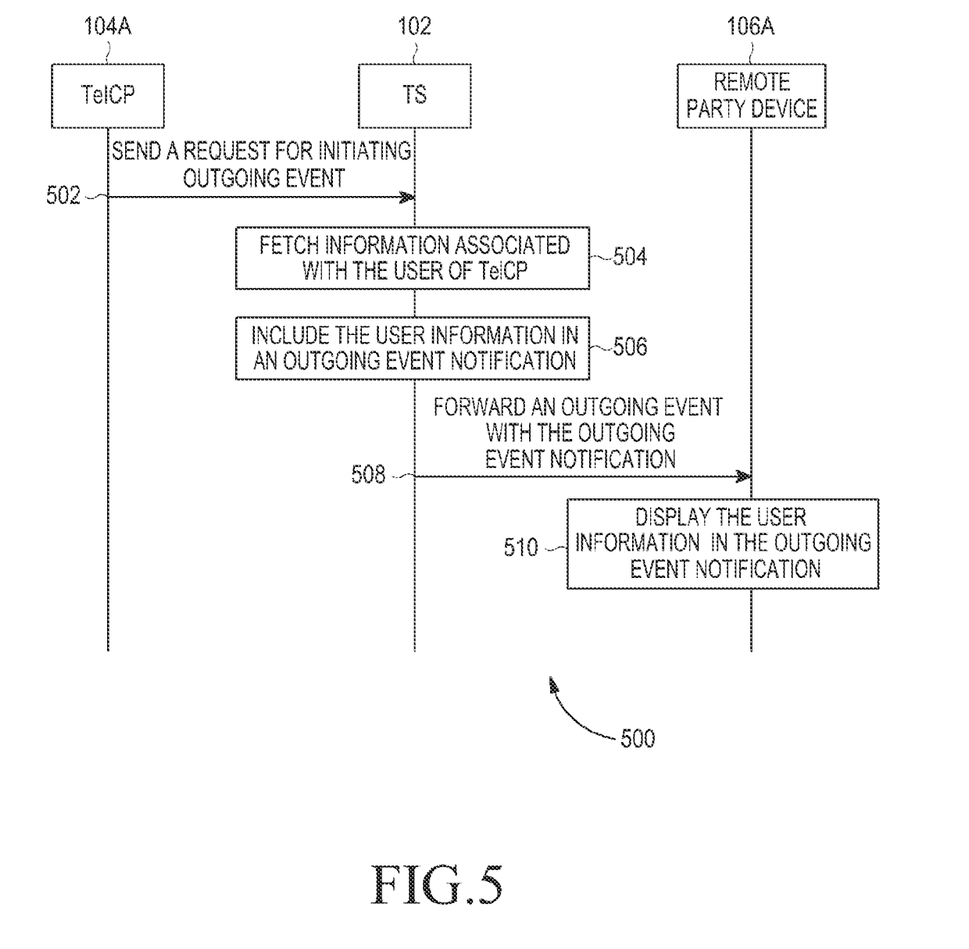
FIG. 5 is a flow diagram illustrating a method of providing an outgoing event notification associated with an incoming event intended from the remote party, according to an embodiment of the present invention.

FIG. 5 is a flow diagram 500 illustrating a method of providing an outgoing event notification associated with an incoming event intended from the remote party, according to an embodiment of the present invention. At step 502, the TelCP 104A sends a request to initiate an outgoing event (e.g., call, message, or chat) for a remote party to the TS 102. At step 504, the TS 102 fetches information associated with the user based on the request. At step 506, the TS 102 includes the fetched information in an outgoing event notification. For example, the TelCP 104A may request the TS 102 to include the user information in the outgoing event notification through a StartCall( ) action. The StartCall( ) action may include the following arguments:

| TelCPName | IN | A ARG TYPE TelCPName |
| SecretKey | IN | A ARG TYPE SecretKey |
| CalleeID | IN | A ARG TYPE CalleeID |
| CallPriority | IN | A ARG TYPE CallPriority |
| MediaCapabilityInfo | IN | A ARG TYPE MediaCapabilityInfo |
| CallMode | IN | A ARG TYPE CallMode |
| CallID | OUT | A ARG TYPE CallID |

According to an embodiment of the present invention, the "MediaCapabilityInfo" argument allows the TelCP 104A to specify a media capability associated with the TelCP 104A in the outgoing event notification. An exemplary structure of the media capability information is provided in APPENDIX 'F' and an extension to the media capability information is provided in APPENDIX 'G'. In another embodiment of the present invention, the StartCall( ) action includes a new argument for including the user information in the outgoing event notification.

Figure 7:
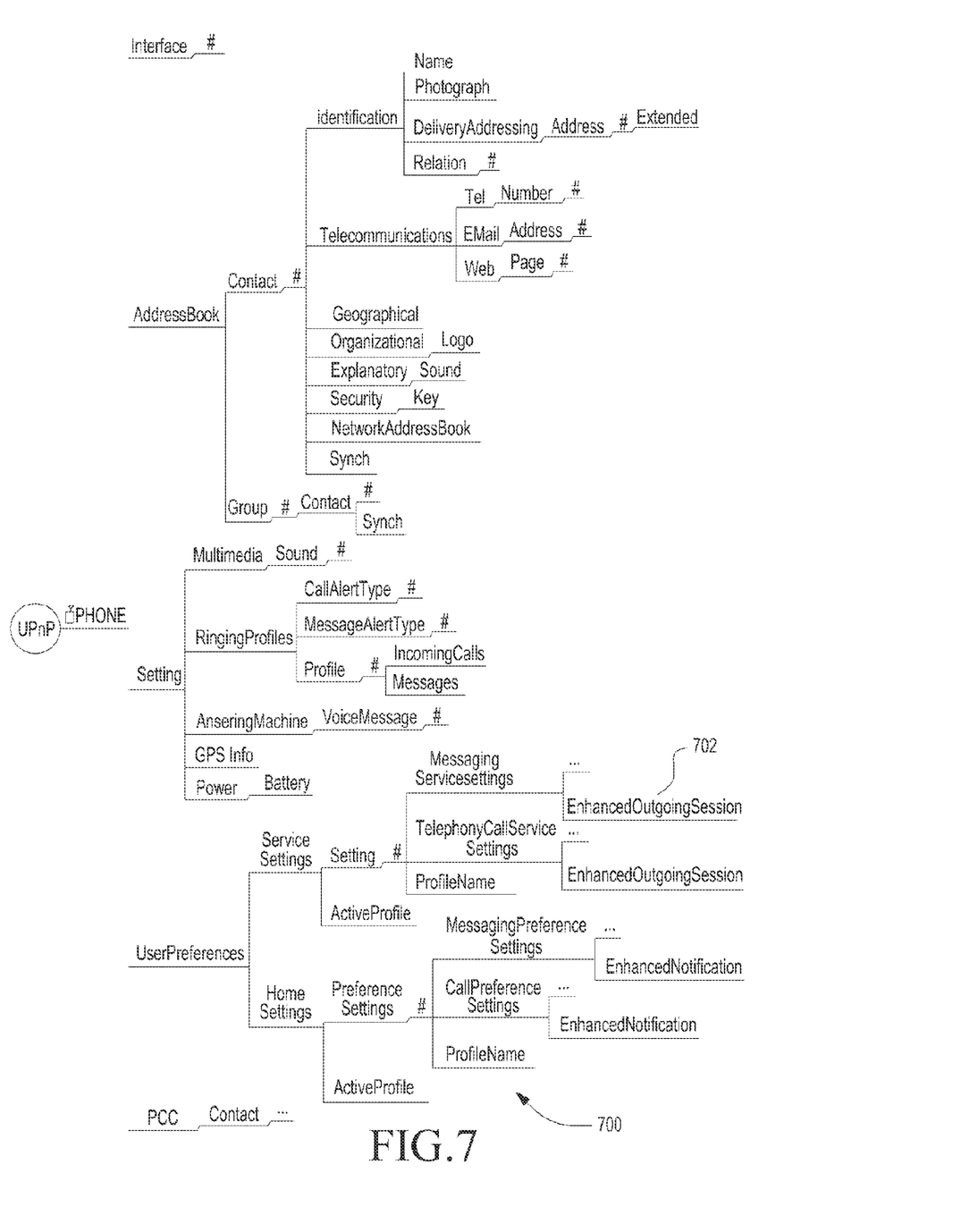
FIG. 7 is a schematic representation of a phone data model having a new element for storing configuration settings associated with an outgoing event notification, according to an embodiment of the present invention.

In an additional embodiment of the present invention, the TS 102 maintains configuration settings such that the TelCP 104A need not include the information in the StartCall( ). Thus, when the TelCP 104A includes the StartCall( ) action in the outgoing event initiation request, the TS 102 includes the user information in the outgoing event notification. In one implementation, the TS 102 stores the configuration setting in the phone data model. Referring to FIG. 7, a phone data model 700 includes a new element 'EnhancedOutgoingSession' 702 for storing the configuration settings for including the user information in the outgoing event notification. For example, the new element 'EnhancedOutgoingSession' 702 stores a value 'image', 'location', presence', or 'service capability' as configuration settings. Therefore, depending on the value set in the new element 702, the TS 102 includes information associated with the user in the outgoing event notification. When the value of the new element 'EnhancedOutgoingSession' 702 is set to 'empty', the TS 102 does not include the information associated with the user in the outgoing event notification.

Referring again to FIG. 5, at step 508, the TS 102 sends the outgoing event with an outgoing event notification to the remote party. The outgoing event notification includes the information associated with the user, where the user information includes contact information, image information, location information, presence information, and/or service capabilities. At step 510, a display device associated with the remote party displays the user information in the outgoing event notification. In this manner, when a user is initiating an outgoing event to the remote party, the TelCP 104A can include information associated with the user in the outgoing event initiation request so that the user information is displayed to the remote party irrespective of whether the remote party is subscribed to the information associated with the user.

Figure 8A:
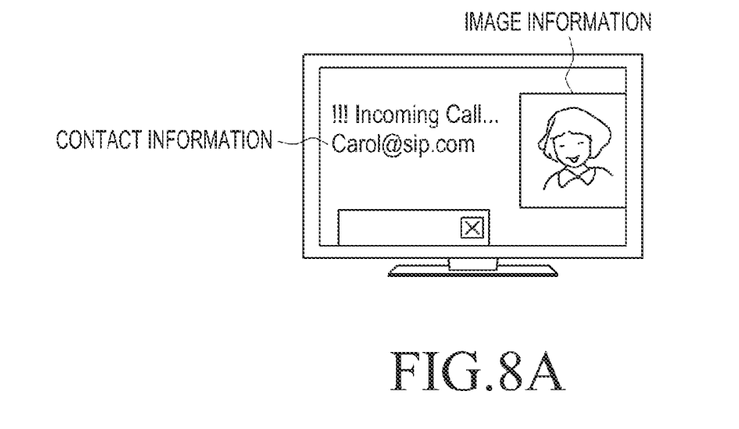
FIGS. 8A through 8D are screenshot views of the TelCP displaying an enhanced incoming call notification associated with an incoming call received from a remote party, according to an embodiment of the present invention.
Figure 8B:
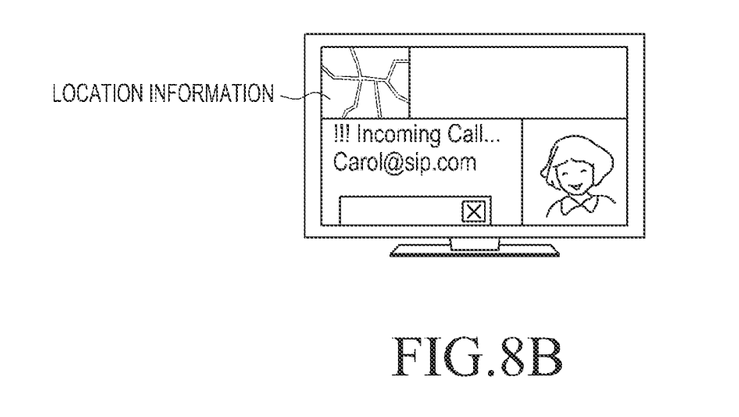
Figure 8C:
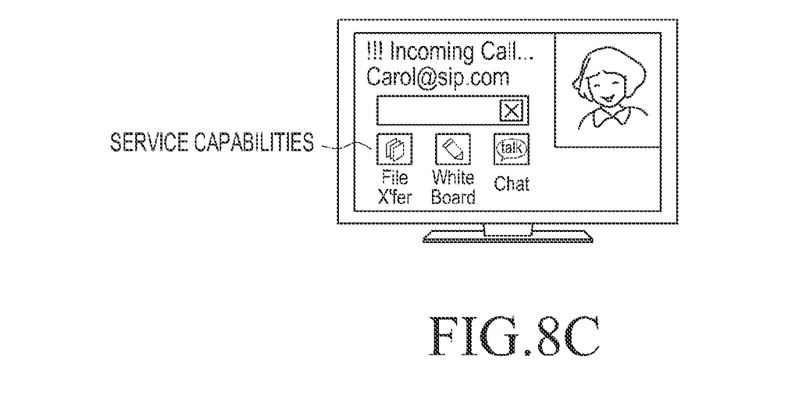
Figure 8D:
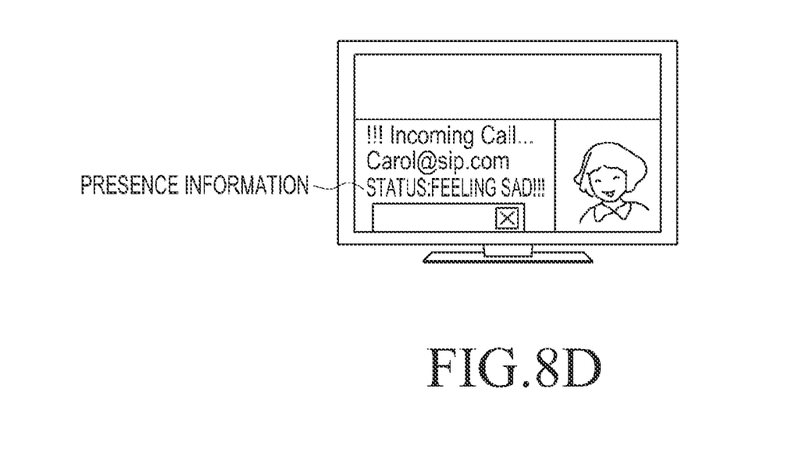

FIGS. 8A through 8D are screenshot views of the TelCP 104A displaying an enhanced incoming call notification associated with an incoming call received from a remote party, according to an embodiment of the present invention. As described above, when the TS 102 receives an incoming call for the TelCP 104A from the remote party, the TS 102 fetches information such as, for example, contact information, image, location, presence status, and service capabilities from various sources such as, for example, the address book 112, the presence service 114, and the like, and includes the information in an incoming call notification. Also, the TS 102 forwards the incoming call with the enhanced incoming call notification to the TelCP 104A. In FIG. 8A, the TelCP 104A displays an image of the remote party along with the email ID of the remote party as the additional information. In FIG. 8B, the TelCP 104A displays an image and location information of the remote party along with the email ID of the remote party. In FIG. 8C, the TelCP 104A displays an image and service capability information of the remote party along with the email ID of the remote party. In FIG. 8D, the TelCP 104A displays an image and presence information (e.g., 'feeling sad!!!') of the remote party along with the email ID of the remote party.

Figure 9:
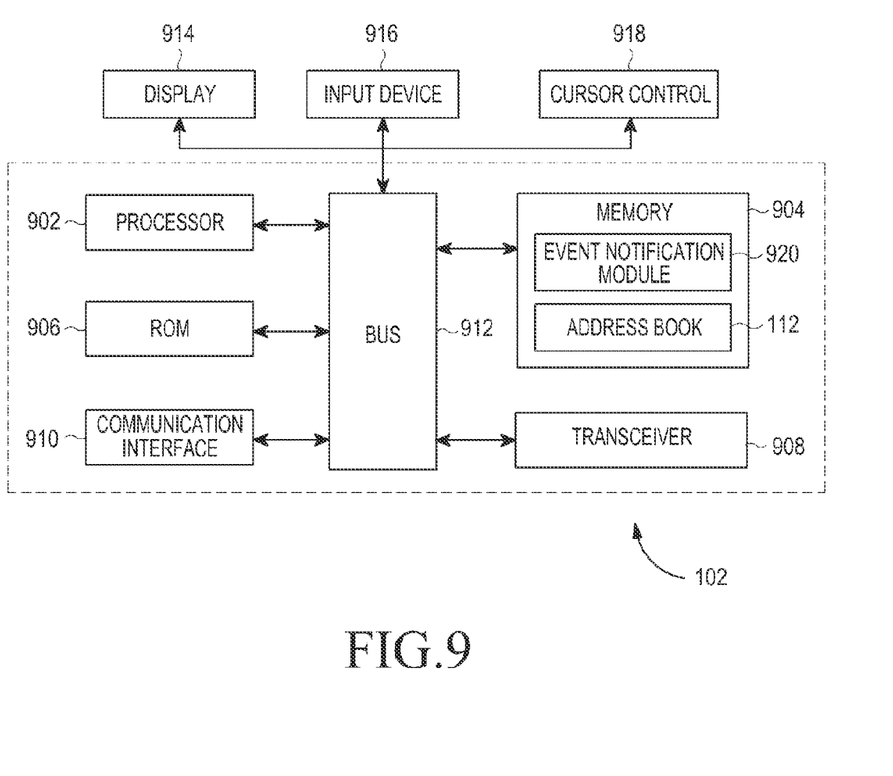
FIG. 9 is a block diagram illustrating various components of a TS, such as those shown in FIG. 1, for implementing embodiments of the present invention.

FIG. 9 is a block diagram illustrating various components of the TS 104, such as those shown in FIG. 1, for implementing embodiments of the present invention. In FIG. 9, the TS 102 includes a processor 902, a memory 904, a Read Only Memory (ROM) 906, a transceiver 908, a bus 912, a communication interface 910, a display 914, an input device 916, and a cursor control 918.

The processor 902, as used herein, refers to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 902 may also include embedded controllers, such as, for example, generic or programmable logic devices or arrays, application specific integrated circuits, single-chip computers, smart cards, and the like.

The memory 904 may be a volatile memory and a non-volatile memory. The memory 904 includes an event notification module 920 in the form of instructions stored therein to provide enhanced event notifications in the UPnP home networking environment 100, according to embodiments of the present invention. A variety of computer-readable storage media may be stored in and accessed from the memory elements. Memory elements may include any suitable memory device(s) for storing data and machine-readable instructions, such as, for example, ROM, Random Access Memory (RAM), Erasable Programmable Read Only Memory (EPROM), Electrically Erasable Programmable Read Only Memory (EEPROM), hard drive, removable media drive for handling memory cards, Memory Sticks™, and the like.

Embodiments of the present invention may be implemented in conjunction with modules, including functions, procedures, data structures, and application programs, for performing tasks, or defining abstract data types or low-level hardware contexts. Machine-readable instructions stored on any of the above-described storage media may be executable by the processor 902. For example, a computer program may include machine-readable instructions capable of providing enhanced event notifications in the UPnP home networking environment 100, according to embodiments of the present invention. In one embodiment of the present invention, the computer program may be included on a storage medium and loaded from the storage medium to a hard drive in the non-volatile memory.

Components such as the transceiver 908, communication interface 910, the display 914, the input device 916, and the cursor control 918 are well known to those skilled in the art.

The various devices, modules, selectors, estimators, and the like described herein may be enabled and operated using hardware circuitry, for example, Complementary Metal Oxide Semiconductor (CMOS) based logic circuitry, firmware, software and/or any combination of hardware, firmware, and/or software embodied in a machine readable medium. For example, the various electrical structure and methods may be embodied using transistors, logic gates, and electrical circuits, such as an application specific integrated circuit.

While the invention has been shown and described with reference to certain embodiments thereof, it will be understood by those skilled in the art that various changes in form and detail may be made therein without departing from the spirit and scope of the invention as defined by the appended claims.

APPENDIX 'A'

```
...
...
    <remoteParty>
        <peer:id>ID of the Peer</peer:id>
        <RemotePartyInfo type="mime type for
        page">URL</RemotePartyInfo>
        ...
        ...
        ...
    </remoteParty>
```

APPENDIX 'B'

```
...
...
    <remoteParty>
        <peer:id>ID of the Peer</peer:id>
        <thumb_img type="Image_type">URL</thumb_img>
        <location type="map/GPS/text">URL/value/text<location>
        <service_capabilities>comma separated
        service list</service_capabilities>
        <Presence_Attribute     name="Presence     attribute
name">Value<Presence_Attribute>
        ...
        ...
        ...
    </remoteParty>
```

APPENDIX 'C'

```
<?xml version="1.0" encoding="UTF-8"?>
<peer:peer
    xsi:schemaLocation="urn:schemas--upnp-org:phone:peer
    upnp.org/schemas/phone/peer-v1.xsd"
    xmlns:xsi="w3.org/2001/XMLSchema-instance"
    xmlns:peer="urn:schemas-upnp-org:phone:peer">
    <peer:id>
        The identifier of the Peer (e.g., phone number, etc.)
    </peer:id>
    <peer:name>A user friendly name for the Peer</peer:name>
    <peer:contactInstanceId>
        The instance identifier for a contact referred by the Peer
    </peer:contactInstanceId>
    <peer:groupInstanceId>
        The instance identifier for a group referred by the Peer
    </peer:groupInstanceId>
    <peer:image type="URL/thumbnail">
      <content-type>content type information for the image data
      </content-type>
      <content-Transfer-Encoding>Encoding information
      </content-Transfer-Encoding>
      <imagedata>actual image information</imagedata>
    </peer:image>
    <peer:location type=map/coordinates> Either a URL points to map
information; URL for a map image OR it could include longitude and
latitude information in ["LAT LON"] order.
    </peer:location>
</peer:peer>
```

APPENDIX 'D'

```xml
<?xml version="1.0" encoding="UTF-8"?>
<messaging:message
    xsi:schemaLocation="urn:schemas-upnp-org:phone:messaging
    upnp.org/schemas/phone/messaging-v1.xsd"
    xmlns:xsi="w3.org/2001/XMLSchema-instance"
    xmlns:messaging="urn:schemas-upnp-org:phone:messaging"
    xmlns:peer="urn:schemas-upnp-org:phone:peer">
    <messageID>ID of the Message(i.e., abcdef.123456)</messageID>
    <sessionID>ID of the Session</sessionID>
    <messageClass>Class of the Message</messageClass>
    <messageFolder>Folder where the Message is
    stored</messageFolder>
    <messageStatus>Status of the Message</messageStatus>
    <replyMessageID>ID of the replied Message</replyMessageID>
    <recipientsList>
        <recipientTo>
            Recipient information (i.e.,
            <peer:id>jane.doe@acme.com</peer:id>
            <peer:contactInstanceId>12</peer:contactInstanceId>)
        </recipientTo>
        <!-- Any other recipientTo (if any) go here.-->
        <recipientCc>
            Cc Recipient information (i.e.,
            <peer:id>Bull.Dog@dogs.com</peer:id>)
        </recipientCc>
        <!-- Any other recipientCc (if any) go here.-->
        <recipientBcc>
            Bcc Recipient information (i.e.,
            <peer:id>Fox.Terrier@dogs.com</peer:id>
            <peer:name>Fox Terrier</peer:name>
            <peer:contactInstanceId>4</peer:contactInstanceId>)
        </recipientBcc>
        <!-- Any other recipientBcc (if any) go here.-->
        <recipientFrom>
            Sender information (i.e.,
            <peer:id>The.Sender@fromhere.com</peer:id>
            <peer:name>Bob the Sender</peer:name>)
        </recipientFrom>
    </recipientsList>
    <subject>Message title</subject>
    <text>Message text</text>
    <attachments>
        <attachment>
            <uri>
            URI of the attachment(i.e.,http://192.168.1.3/file1.pdf)
            </uri>
            <size>Size of the attachment</size>
            <mimeType>MIME type of the attachment</mimeType>
        </attachment>
        <!-- Any other attachment (if any) go here.-->
    </attachments>
    <dateSent>Date when the Message is sent</dateSent>
    <dateReceived>Date when the Message is received</dateReceived>
</messaging:message>
```

APPENDIX 'E'

```xml
<?xml version="1.0" encoding="UTF-8"?>
<messaging:sessionsList
    xsi:schemaLocation="urn:schemas-upnp-org:phone:messaging
    upnp.org/schemas/phone/messaging-v1.xsd"
    xmlns:xsi="w3.org/2001/XMLSchema-instance"
    xmlns:messaging="urn:schemas-upnp-org:phone:messaging"
    xmlns:peer="urn:schemas-upnp-org:phone:peer">
    <sessionInfo>
        <sessionID>ID of the Session</sessionID>
        <sessionClass>Class of the Session</sessionClass>
        <sessionStatus>Status of the Session</sessionStatus>
        <recipientsList>
            <recipientTo>
                Recipient information
            </recipientTo>
            <!-- Any other recipientTo (if any) go here.-->
            <recipientCc>
                Cc Recipient information
            </recipientCc>
            <!-- Any other recipientCc (if any) go here.-->
```

APPENDIX 'E'-continued

```xml
            <recipientBcc>
                Bcc Recipient information
            </recipientBcc>
            <!-- Any other recipientBcc (if any) go here.-->
            <recipientFrom>
                Session creator information
            </recipientFrom>
        </recipientsList>
    </sessionInfo>
    <!-- Any other sessionInfo (if any) go here.-->
</messaging:sessionsList>
```

APPENDIX 'F'

```xml
<?xml version="1.0" encoding="utf-8"?>
<cams:mediaCapabilityInfo
    xsi:schemaLocation="urn:schemas-upnp-org:phone:cams
    upnp.org/schemas/phone/cams.xsd"
    xmlns:xsi="w3.org/2001/XMLSchema-instance"
    xmlns:cams="urn:schemas-upnp-org:phone:cams">
    <mediaMixingCapability></mediaMixingCapability>
    <mediaSharingCapability></mediaSharingCapability>
    <enableMediaMixing> 1 or 0 </enableMediaMixing>
    <shareMedia>Media Session ID</shareMedia>
    <mediaCapability format="format of the Media Capability">
        Media capability
    </mediaCapability>
    <nativeMediaCapability format="format of the Native Media
    Capability">
        Media capability
    </nativeMediaCapability>
</cams:mediaCapabilityInfo>
```

APPENDIX 'G'

```xml
<?xml version="1.0" encoding="utf-8"?>
<cams:mediaCapabilityInfo
    xsi:schemaLocation="urn:schemas-upnp-org:phone:cams
    upnp.org/schemas/phone/cams.xsd"
    xmlns:xsi="w3.org/2001/XMLSchema-instance"
    xmlns:cams="urn:schemas-upnp-org:phone:cams">
    <Refer_Infortype="Location/Image/...">URL</Refer_Info>
    <shareMedia>MediaSession ID</shareMedia>
    <mediaCapability format="format of the Media Capability">
        Media capability
    </mediaCapability>
    <nativeMediaCapability format="format of the Native Media
    Capability">
        Media capability
    </nativeMediaCapability>
</cams:mediaCapabilityInfo>
```

The invention claimed is:

1. A method of providing an incoming event notification to a telephony client in a home network environment, comprising the steps of:
    receiving an incoming event associated with a remote device by a telephony server;
    acquiring information associated with the remote device by the telephony server, the information being stored in the telephony server or in an other electronic device;
    generating an incoming event notification associated with the incoming event, the incoming event notification comprising the information associated with the remote device; and
    forwarding the incoming event notification to at least one telephony client in the home network environment.

2. The method of claim 1, wherein the information associated with the remote device comprises at least one of contact information, image information, location information, presence information, and service capabilities.

3. The method of claim 1, wherein the incoming event is associated with at least one of a call service and a messaging service.

4. The method of claim 1, wherein the incoming event is received from an external network and the incoming event notification is forwarded by the home network environment.

5. The method of claim 1, wherein displaying the information associated with the remote party with the incoming event notification on the display comprises:
displaying a Uniform Resource Locator (URL) associated with the remote party information of the remote party on the display of the at least one telephony control point.

6. The method of claim 5, wherein displaying the URL comprises:
acquiring the information associated with the remote party from a backend server via the URL; and
displaying the information associated with the remote party on the display associated with the at least one telephony control point.

7. A telephony server communicatively coupled to at least one telephony client in a home network, comprising:
a transceiver;
a memory comprising at least one storage media which stores non-transitory machine-readable instructions; and
at least one processor, wherein the at least one processor executes the non-transitory machine-readable instructions for the telephony server to perform, when the transceiver receives an incoming event from a remote device, the steps of:
acquiring information associated with the remote device, the information being stored in the telephony server or in an other electronic device;
generating an incoming event notification associated with the incoming event and having the information associated with the remote device; and
forwarding the incoming event notification to the at least one telephony client,
wherein the at least one telephony client displays the information associated with the remote device with the incoming event notification.

8. The telephony server of claim 7, wherein the information associated with the remote device comprises at least one of contact information, image information, location information, presence information, and service capabilities.

9. The telephony server of claim 7, wherein the incoming event is associated with a call service and a messaging service.

10. The telephony server of claim 7, wherein in displaying the information associated with the remote device with the incoming event notification, the telephony client is operable for displaying a Uniform Resource Locator (URL) associated with the information of the remote device.

11. The telephony server of claim 10, wherein, in displaying the URL, the at least one telephony client is operable for:
acquiring the information associated with the remote device from a backend server via the URL; and
displaying the acquired information associated with the remote device.

12. A method of providing user information in an outgoing event in a home network environment, comprising the steps of:
receiving a request to initiate an outgoing event for a remote device from a telephony client;
acquiring information associated with a user of the telephony client;
generating an outgoing event notification associated with the outgoing event with the information associated with the user; and
initiating the outgoing event with the outgoing event notification to the remote device.

13. The method of claim 12, wherein the information associated with the user comprises at least one of contact information, image information, location information, presence information, and service capabilities.

14. The method of claim 12, wherein the outgoing event is a call, a message, a status update, or a chat.

15. The method of claim 12, further comprising:
displaying the information associated with the user with the outgoing event notification to the remote device when the outgoing event has arrived at the remote device.

16. A telephony server communicatively coupled with a telephony client in a home network, comprising:
a transceiver;
a memory comprising at least one storage media which stores non-transitory machine-readable instructions; and
at least one processor, wherein the at least processor executes the non-transitory machine-readable instructions for the telephony server to perform the steps of:
when the transceiver receives a request to initiate an outgoing event acquiring information associated with a user of the telephony client;
generating an outgoing event notification associated with the outgoing event with the information associated with the user; and
initiating the outgoing event with the outgoing event notification to the remote device so that the information associated with the user and the outgoing event notification are displayed in the remote device when the outgoing event arrives at the remote device.

17. The telephony server of claim 16, wherein the information associated with the user comprises at least one of contact information, image information, location information, presence information, and service capabilities.

18. The telephony server of claim 16, wherein the outgoing event is a call, a message, a status update, or a chat.

19. A method for a telephony client communicatively coupled to a telephony server in a home network, comprising:
receiving, from the telephony server, an incoming event generated by a remote device and an incoming event notification generated by the telephony server, the incoming event notification comprising first information associated with the remote device, the first information comprising a Uniform Resource Locator (URL) of second information associated with the remote device;
acquiring the second information associated with the remote device using the URL in the first information; and
displaying the second information associated with the remote device with the incoming event notification on a display of the telephony client.

20. The method of claim 19, further comprising:
displaying the URL associated with the remote device information of the remote device on the display of the telephony client.

* * * * *